United States Patent
Sleeman et al.

(10) Patent No.: US 7,366,740 B2
(45) Date of Patent: Apr. 29, 2008

(54) SYSTEMS AND METHODS FOR AUTOMATIC MAINTENANCE AND REPAIR OF ENITITES IN A DATA MODEL

(75) Inventors: Martin J. Sleeman, Redmond, WA (US); Artem A. Oks, Bellevue, WA (US); Hanumantha Rao Kodavalla, Sammamish, WA (US); Nigel R. Ellis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 10/903,187

(22) Filed: Jul. 30, 2004

(65) Prior Publication Data
US 2005/0262378 A1   Nov. 24, 2005

Related U.S. Application Data

(63) Continuation-in-part of application No. 10/837,932, filed on May 3, 2004, now Pat. No. 7,143,120.

(51) Int. Cl.
*G06F 17/30* (2006.01)
*G06F 7/00* (2006.01)

(52) U.S. Cl. .................. 707/202; 707/101; 707/102
(58) Field of Classification Search ............... 707/101, 707/3, 202, 102
See application file for complete search history.

(56) References Cited

U.S. PATENT DOCUMENTS

| | | | |
|---|---|---|---|
| 4,945,474 A | 7/1990 | Elliott et al. ............ 364/200 |
| 5,740,434 A | 4/1998 | Eastep ..................... 395/618 |
| 5,900,870 A | 5/1999 | Malone et al. ........... 345/333 |
| 6,047,291 A | 4/2000 | Anderson et al. ........ 707/103 |
| 6,108,004 A | 8/2000 | Medl ........................ 345/346 |
| 6,112,024 A | 8/2000 | Almond et al. .......... 395/703 |
| 6,199,195 B1 | 3/2001 | Goodwin et al. ........... 717/1 |
| 6,247,026 B1* | 6/2001 | Waldo et al. ............. 707/206 |
| 6,314,433 B1 | 11/2001 | Mills et al. .............. 707/202 |
| 6,338,056 B1 | 1/2002 | Dessloch et al. .......... 707/2 |
| 6,370,541 B1 | 4/2002 | Chou et al. .............. 707/103 |
| 6,454,159 B1 | 9/2002 | Takushima ................ 228/253 |
| 6,477,564 B1 | 11/2002 | Freyssinet et al. ........ 709/202 |
| 6,519,597 B1 | 2/2003 | Cheng et al. .............. 707/10 |
| 6,542,904 B2 | 4/2003 | Crus et al. ................ 707/200 |
| 6,556,983 B1 | 4/2003 | Altschuler et al. .......... 706/55 |

(Continued)

OTHER PUBLICATIONS

Marie Hedin: Ascential AuditStage Method and Application Guide, Version 7.0, Aug. 2003, Ascential AuditStage Corp.*

(Continued)

*Primary Examiner*—Kuen S. Lu
(74) *Attorney, Agent, or Firm*—Woodcock Washburn LLP

(57) ABSTRACT

The present invention is directed a logical consistency checker (LCC) working alone or in conjunction with a physical consistency checker (PCC) and/or a data reliability system (DRS) for a database files system of a hardware/software interface system. Logical data correction pertains to logical data corruptions for entities (e.g., items, extensions, and/or relationships in an item-based operating system, where an item-based operating system is one example of an item-based hardware/software interface system). In this regard, a LCC analyses and corrects logical damage to entities representatively stored in the data store in order to ensure that all such entities in said data store are both consistent and conform to the data model rules.

39 Claims, 5 Drawing Sheets

U.S. PATENT DOCUMENTS

| | | | |
|---|---|---|---|
| 6,578,046 B2 | 6/2003 | Chang et al. | 707/103 |
| 6,671,699 B1 | 12/2003 | Black et al. | 707/201 |
| 6,671,757 B1 | 12/2003 | Multer et al. | 710/100 |
| 6,694,336 B1 | 2/2004 | Multer et al. | 707/201 |
| 6,738,789 B2 | 5/2004 | Multer et al. | 707/201 |
| 6,757,696 B2 | 6/2004 | Multer et al. | 707/201 |
| 6,760,736 B2* | 7/2004 | Waldo et al. | 707/206 |
| 6,772,178 B2 | 8/2004 | Mandal et al. | 707/204 |
| 7,143,120 B2* | 11/2006 | Oks et al. | 707/200 |
| 2002/0091702 A1 | 7/2002 | Mullins | 707/100 |
| 2002/0143521 A1 | 10/2002 | Call | 704/1 |
| 2002/0152422 A1 | 10/2002 | Sharma et al. | 714/13 |
| 2002/0198891 A1 | 12/2002 | Li et al. | 707/102 |
| 2003/0158839 A1 | 8/2003 | Faybishenko et al. | 707/3 |
| 2005/0262378 A1* | 11/2005 | Sleeman et al. | 714/1 |
| 2006/0106889 A1* | 5/2006 | Mannby | 707/203 |

OTHER PUBLICATIONS

Bullock, et al., "Recovery of Data Pages after Partial Page Writes", *IBM Technical Disclosure Bulletin*, Aug. 1991, 34(3), 69-83.

Ciccozzi, Microsoft Press Computer Dictionary, 1997, 3rd Edition, 39-40.

Levy, E. et al., "Incremental Recovery in Main Memory Database Systems", *IEEE Transactions on Knowledge and Data Engineering*, Dec. 1992, 4(6), 529-540.

Ponnekanti, N. et al., "Online Index Rebuild", *AMC Simod International Conference on Management of Data*, 2000, 529-538.

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed)*; North Holland Publishing Company; 1976, 125-147.

Buneman, P. et al., Inheritance and Persistance in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-53.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM Sigmod Record*, Sep. 1996, 25(2), 70-76.

Darby, C., Object Serialization in Java 1.1. Making Objects Persistent, *Web Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 234-259.

Hernandez, M.A. et al, "The Merge/Purge Problem for Large Databases, International Conference on Management of Data and Symposium on Principles of Database Systems", *Proceedings of the 1995 ACM Sigmod International Conference on Management of Data*, 1995, 127-138.

Hsiao, H.I. et al., "DLFM: A Transactional Resource Manager", *SIGMOD, Proceedings of the 2000 ACM Sigmod International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp- An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2), 108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM Sigmod International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Babb, Andrew et al., "Maximum Availability Architecture: Overview," *Oracle Corporation White Paper*, Oct. 2002, 13 pgs.

\* cited by examiner

SYSTEMS AND METHODS FOR AUTOMATIC MAINTENANCE AND REPAIR OF ENITITES IN A DATA MODEL

CROSS-REFERENCE

This application is a continuation-in-part of U.S. patent application Ser. No. 10/837,932, filed on May 3, 2004 now U.S. Pat. No. 7,143,120, entitled "SYSTEMS AND METHODS FOR AUTOMATIC DATABASE OR FILE SYSTEM MAINTENANCE AND REPAIR," the entire contents of which are hereby incorporated herein by reference (and hereafter referred to herein as the "Parent Patent Application").

This application is related by subject matter to the inventions disclosed in the following commonly assigned applications, the contents of which are hereby incorporated into this present application in their entirety (and hereafter collectively referred to herein as the "Related Patent Applications"): U.S. patent application Ser. No. 10/647,058, filed on Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS A METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,645, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, filed on Aug. 21, 2003, entitled "STORAGE PLATFORM FOR ORGANIZING, SEARCHING, AND SHARING DATA"; U.S. patent application Ser. No. 10/646,580, filed on Aug. 21, 2003, entitled "SYSTEMS AND METHODS FOR DATA MODELING IN AN ITEM-BASED STORAGE PLATFORM."

TECHNICAL FIELD

The present invention relates generally to file system management and, more particularly, to automatic file system maintenance and repair to ensure data reliability and consistency with regard to a data model. Various aspects of the present invention pertain to responding to and correcting logical data errors at a data entity level without losing other, down-level (child) data entities. In particular, various aspects of the present invention pertain specifically to the maintenance of logical data in an item-based hardware/software interface system.

BACKGROUND

While client database platforms (i.e., home and business desktop computers) use hardware of a quality that is much lower than on server platforms, even server-class hardware (controllers, drivers, disks, and so forth) can cause "physical" data corruption such that a read operation does not return what the database application wrote to the data store. Of course, this is clearly a more prolific problem with client database platforms (as opposed to server database platforms) for various reasons including without limitation the increased probability of a client machine been arbitrarily powered off in the midst of a write operation due to an unexpected power outage (which in turn leads to torn pages and potential database corruptions) whereas it is more common for server database systems to utilize uninterruptible power supplies to mitigate problems from power outages. Media decay is another source of "physical" data corruptions, where the physical storage media quite literally wears out over time. And yet another source of concern regarding reliability is the detection and recovery from "logical" corruptions caused by software errors whether inadvertent (e.g., bugs) or pernicious (e.g., viruses).

Traditionally maintenance and repair of a databases (and database file systems) has fallen to database managers and the like having a well-developed skill set and deep knowledge of database systems, or at least to individuals who are familiar with and regularly use database systems—by and large persons relatively skilled with regard to database technologies. On the other hand, typical consumer and business end-users of operating systems and application programs rarely work with databases and are largely ill-equipped to deal with database maintenance and repair issues.

While the disparate level of skill between these two groups has been largely irrelevant in the past, a database-implemented file system for an hardware/software interface system—such as the hardware/software interface system disclosed in the Related Patent Applications—creates a scenario where these lesser-skilled end-users will be faced with database maintenance and repair issues they will largely be unable to resolve. Thus a business/consumer database-implemented operating system file system, or "database file system" (DBFS) for short, must be able to detect corruptions and recover its databases to a transactionally consistent state and, in the cases of unrecoverable data loss, the DBFS must then guarantee logical data consistency at the level atomic change units to said data are maintained (i.e., at the "item" level for an item-based DBFS). Moreover, for DBFSs running by default in a lazy commit mode, the durability of transactions committed just before an abnormal shutdown is not guaranteed and must be accounted for and corrected.

Moreover, while business/consumer end-users will greatly benefit from automating DBFS maintenance and recovery, database managers and those of greater database skills will also benefit from a technical solution for general database maintenance and repair. It is commonplace in the art for database administrators to utilize database tools (for example, the database tuning advisor provided with SQL Server 2000), but these tools do not directly address reliability but instead provide a means by which backups of the database are administered and managed—and not in a mostly-automated fashion, but instead requiring substantial database administrator involvement, particularly when database backups are not available or other repair issues arise. Thus an automated solution to address database reliability would also be beneficial for database administrators and other skilled database users, and the invention described in the Parent Patent Application provides one overarching solution.

Various embodiments of the invention of the Parent Patent Application are directed to a data reliability system (DRS) for a DBFS wherein the DRS comprises a framework and a set of policies for performing database administration (DBA) tasks automatically and with little or no direct involvement by an end-user (and thus is essentially transparent to said end-user). For several embodiments, the DRS framework implements mechanisms for plugging error and event notifications, policies, and error/event handling algorithms into the DRS. More particularly, for these embodiments DRS is a background thread that is in charge of maintaining and repairing the DBFS in the background, and thus at the highest level the DRS guards and maintains the overall health of the DBFS. For certain embodiments, the DRS comprises the following features with regard to physical data corruption: (1) responding and correcting data corruptions at a page level for all page types; and (2) attempting a second level of recovery (rebuild or restore) for index page corruptions (clustered and non-clustered), data page corruptions, and page corruptions in the log file. Thus, for certain embodiments, the DRS comprising functionality for: (i) handling repair/restore data corruption cases; (ii) improving the reliability and availability of the system; and (iii) keeping a DRS error/event history table for a skilled third party to troubleshoot database or storage engine problems if necessary.

While the foregoing embodiments described and claimed in the Parent Patent Application largely address physical data corruption (i.e., correcting corrupted data in a database stored on the physical storage medium), a robust DRS should also address logical data corruptions to entities (e.g., items, extensions, and/or relationships) representatively stored in the data store in order to ensure that all such entities in said data store are both consistent and conform to the data model rules.

SUMMARY

Various embodiments of the present invention are directed a data reliability system (DRS) for a DBFS, said DBFS comprising a file system (logical data) maintained in a database (physical data) or, stated another way, comprising a database (physical data) that represents a file system (logical data). As described in the Parent Patent Application, the DRS may comprise a framework and a set of policies for performing database administration (DBA) tasks automatically and with little or no direct involvement by an end-user (and thus is essentially transparent to said end-user). The DRS framework implements mechanisms for plugging error and event notifications, policies, and error/event handling algorithms into the DRS. More particularly, for these embodiments DRS is a background thread that is in charge of maintaining and repairing the DBFS in the background, and thus at the highest level the DRS guards and maintains the overall health of the DBFS.

For various embodiments of the present invention, the DRS comprises the following features:

Physical Data Correction: responding to and correcting physical data corruptions at a page level for all page types, and which may include attempts to rebuild or restore operations for index page corruptions (clustered and non-clustered), data page corruptions, and page corruptions in the log file.

Logical Data Correction: responding to and correcting logical data corruptions for "entities," e.g., items, extensions, and/or relationships in an item-based operating system (an item-based operating system being one example of an item-based hardware/software interface system).

In regard to the second bullet, several embodiments of the present invention are specifically directed to a logical consistency checker (LCC) that analyses and corrects logical "damage" to entities (e.g., items, extensions, and/or relationships) representatively stored in the data store in order to ensure that all such entities in said data store are both consistent and conform to the data model rules. For certain embodiments the LCC may be autonomous, while for other embodiments it may be coupled with a physical consistency checker (PCC) for detecting and correcting physical data corruptions, and/or for yet other embodiments the LCC may comprise a component of a DRS such as the DRS described in the Parent Patent Application.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The above summary provides an overview of the features of the invention. A detailed description of one embodiment of the invention follows. For various embodiments described below, the features of the present invention are described as implemented in the MICROSOFT SQL SERVER database system (sometimes referred to herein simply as "SQL") alone or incorporated into the MICROSOFT WinFS file system for the next generation personal computer operating system (commonly referred to as "Windows Longhorn" or "Longhorn" for short), the latter being the primary subject matter of many of the patent applications cross-referenced earlier herein. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Computer Environment

Figure 1:
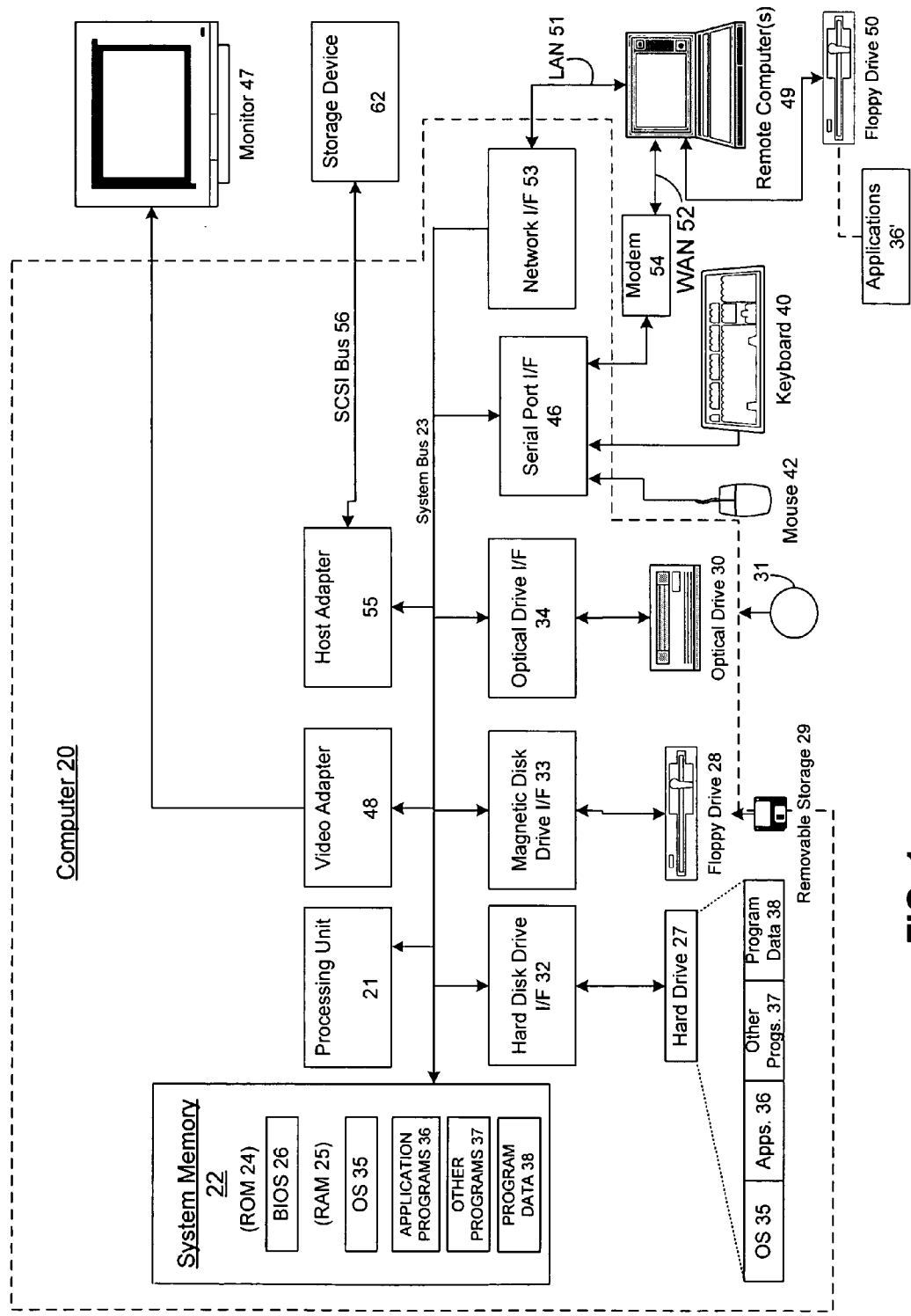
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Overview of the Data Reliability System (DRS)

Figure 2:
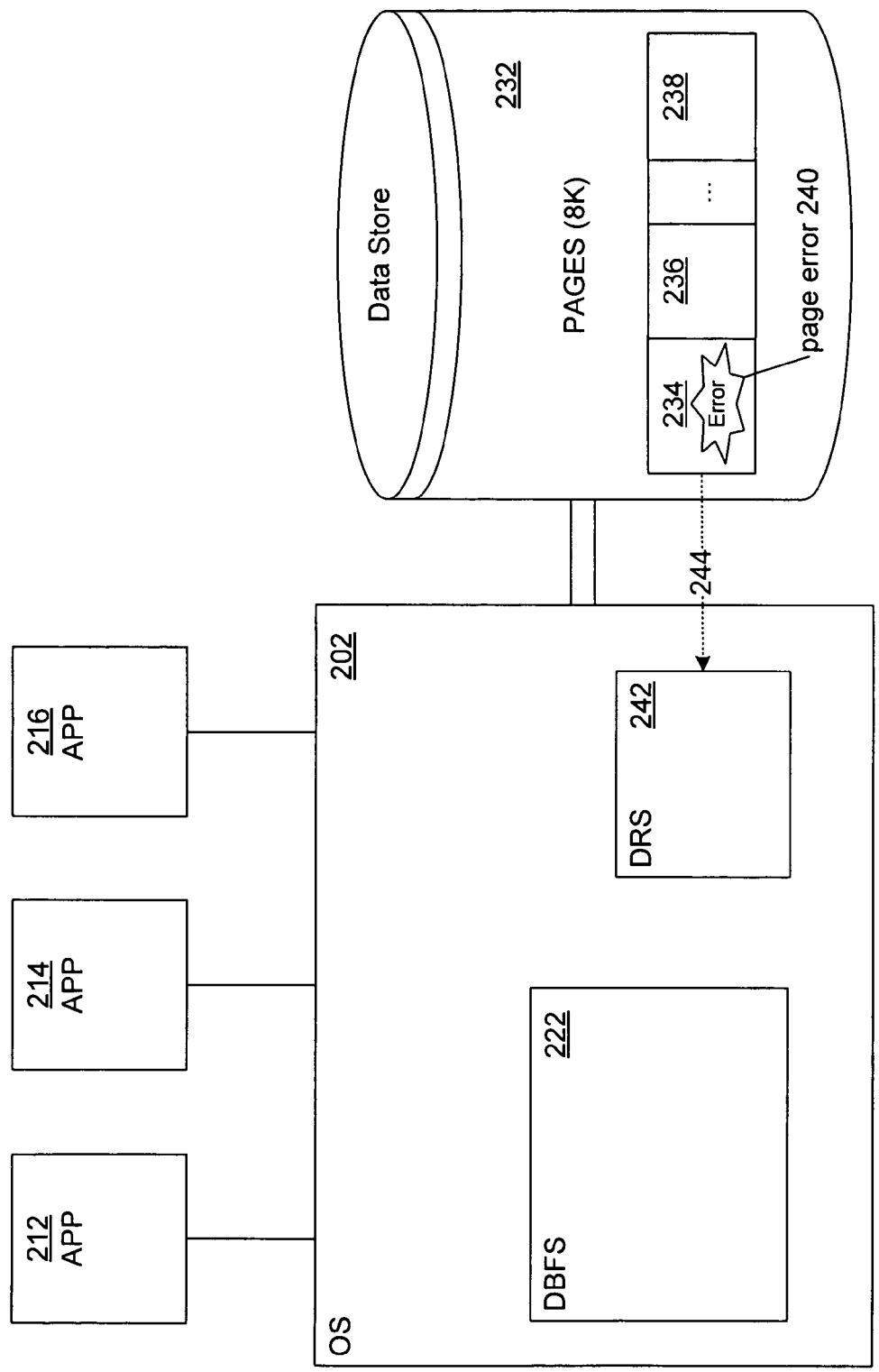
FIG. 2 is a block diagram illustrating the structure of the data reliability system (DRS) in database file system (DBFS) representative of several embodiments of the present invention.

For several embodiments of the present invention, the data reliability system (DRS) is a thread that maintains and repairs the database in the background, and thereby guards the general health of the database file system (DBFS). FIG. 2 is a block diagram illustrating the structure of the DRS in the DBFS. In the figure, an operating system 202 providing operating system level services to a plurality of applications 212, 214, and 216, comprises a DBFS 222 logically coupled to a persistent data store 232. The operating system 202 further comprises a DRS 242 which is invoked 244 by the DBFS 222 whenever, for example, a page error 240 from among a plurality of pages 234, 236, and 238 in the persistent data store 232 is discovered, and the DRS 242 then performs repair operations in response to the page error 240.

Certain embodiments of the present invention provide that the DRS be extensible so that recovery policies and detection mechanisms may be updated after a DBFS has been released. Several embodiments are direct to a DRS that run repairs while the DBFS database is kept online. Still other embodiments are directed to run with full access to the DBFS store (that is, sysadmin privileges). Still other embodiments will have the ability to detect and react to failures in real time.

For several embodiments, DRS repairs will be transactional at the level change units to said data are maintained (i.e., at the "item" level for an item-based DBFS). For various embodiments, repairs will either completely recover an item or it will back out its changes (and thus never partially correct an error), and the DRS may also have the ability to continue the recovery/restoration work even if a reboot occurs half way thru the process. For several embodiments of the present invention, the DRS will subscribe to SQL events so that if SQL fires a general event, the DRS may intercept it and react (including without limitation 823/824 events). In addition, certain embodiments of the present invention are directed to a database engine that may be modified to send DRS-specific events for error conditions that the DRS is to specifically handle.

For various embodiments of the present invention, physical and/or logical corruptions will be detected whenever the DBFS reads or writes pages from disk, in which case SQL will then generate one of a host of errors depending on what type of corruption it is and will also fire specific DRS events to notify it of the specific error conditions, and the DRS will receive those errors and place them on in an incoming queue for processing.

For several embodiments of the present invention, ascertaining whether a page is physically corrupted may be accomplished by various means including, without limitation, (a) examining the checksum for a page and, if the checksum is invalid, the page is considered corrupt or (b) by examining the log serial number (LSN) to see if it is beyond the end of the log file (where an LSN is an integer that is incremented with each transaction so that if the last transaction in the log was LSN 432 and a page with a greater LSN is found then an out of order write error must have occurred. In this regard, there are four major types of page corruptions that can effect the operation of a DBFS (in addition to other sources such as bugs, etc.), and these four types include torn pages, media decay, hardware failure, and out-of-order writes. Torn pages occur when a page of data is not correctly written atomically, and thus any part of the page may be corrupted because during a write only some of the sectors of a page make it to disk before the failure event, for example, a power failure or a sector write failure. Media decay occurs when a data pages bits have been corrupted by physical media decay. A hardware failure could arise for a variety of reasons related to the bus, the controller, or the hard disk device. As for out-of-order write, these errors stem from the fact that IDE drives cannot guarantee the order of writes to the disk, especially the IDE drive has write-caching enabled (turned on), and thus it is possible that writes to the data store may occur out of order. If a partial series of out of order writes occur but are interrupted by a power failure, for example, then several errors may occur, such as the data page being written to disk before the associated log entry being written for example. While out-of-order errors can be detected by checking the log sequence numbers (LSN) on data pages, there is no easy way to do this short of reading every page. Physical data corruptions are discussed in more detail in the Parent Patent Application.

Logical Consistency Checker

Various embodiments of the present invention are specifically directed to a logical consistency checker (LCC) that analyses and corrects logical "damage" to entities (e.g., items, extensions, and/or relationships) representatively stored in the data store in order to ensure that all such entities in said data store are both consistent and conform to the data model rules. For certain embodiments the LCC may be autonomous, while for other embodiments it may be coupled with a physical consistency checker (PCC) for detecting and correcting physical data corruptions, and/or for yet other embodiments the LCC may comprise a component of a DRS such as the DRS described in the Parent Patent Application.

For a file system built with database technology (a database file system), logical consistency is distinct and separate from physical consistency in the sense that the latter (physical consistency) refers to the database structure itself and the physical storage of that database on a storage medium whereas the former (logical consistency) refers to the logical data schema that is represented by the data stored in said database and represents the file system of the hardware/software interface system.

Although physical consistency is related to logical consistency in certain regards (as discussed herein below), certain embodiments of the present invention are primarily directed to ensuring logical consistency. Of course, physical damage resulting in physical inconsistency (e.g., a disk sector goes bad, said disk sector containing a portion of said database structure) may also result in damage to logical consistency (e.g., loss of data for an entity stored in said database at said bad disk sector), but not all logical damage necessarily corresponds to physical damage (e.g., a logical error resulting from a software bug that violates a data model rule). Consequently, logical inconsistencies can be divided into two types: (i) logical inconsistencies due to physical damage, and (ii) logical inconsistencies due to violations of at least one data model rule (for example, all entity property values must be within a rule-specified range, an entity must have all of its constituent parts, and item must have at least one holding relationship, and so on and so forth).

In general, "repairing" a logical error is inherently inferior to "restoring" the data in which the error occurs because a backup of that data is likely a good copy (or can be used to reconstruct a good copy) of the data that was damaged or lost. Therefore, restoration techniques are preferred to repair techniques.

Figure 3:
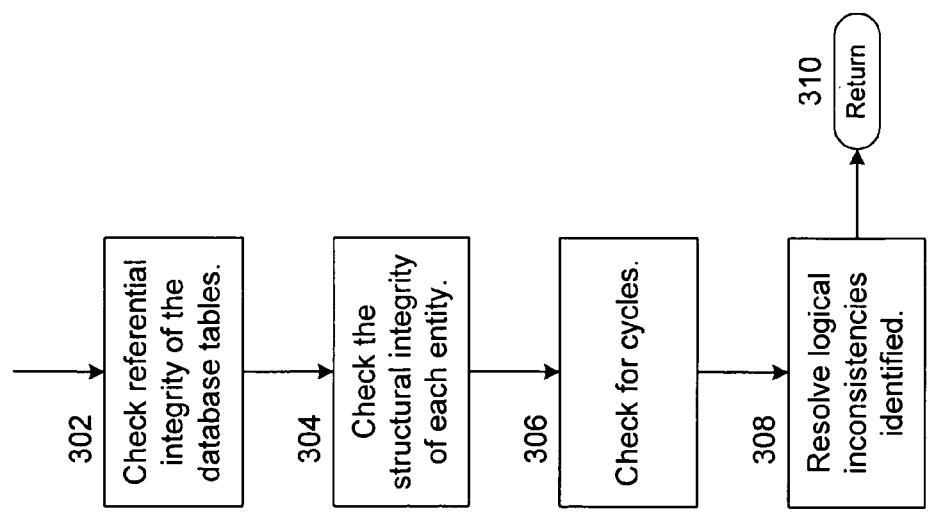
FIG. 3 is a process flow diagram illustrating an approach by which logically corrupted entities are ascertained for certain embodiments of the present invention.

For several embodiments of the present invention, ascertaining whether any entities on a page is logically corrupted may be accomplished using the approach illustrated in FIG. 3. For this approach, at step 302 the LCC checks the database tables for the referential integrity of entities existing in the DBFS (the "entity externals") and then, at step 304, the LCC checks the structural integrity of each entity (the "entity internals," e.g., constraints and relationships) to ensure no data model rule violations. (For certain embodiments, the LCC checks every entity in the database.) At step 306, the LCC for certain embodiments may also check for cycles (e.g., where entity A has a holding relationship to entity B and entity B has a holding relationship to entity A). After the aforementioned checks have been completed, the LCC then, at step 308, resolves the logical inconsistencies identified.

Figure 4:
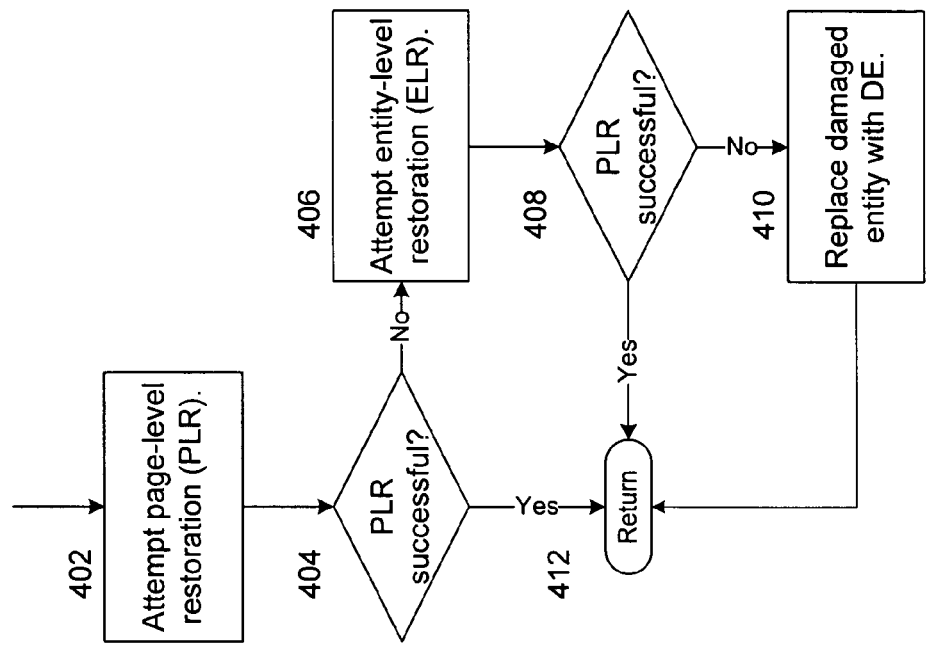
FIG. 4 is a process flow diagram illustrating a three-prong approach for an LCC to resolve logical errors in an entity for certain embodiments of the present invention.

For several embodiments of the present invention, the LCC utilizes a three-prong approach to resolving logical errors as illustrated in FIG. 4. First, at step 402, the LCC will attempt to perform a page-level restoration (PLR) using the most recent snapshot of the page and the transaction log to perfectly restore the page having the error. (This technique is essentially identical to the page-level restoration technique used for physical data corruption as described in the Parent Patent Application.) However, if a PLR is not possible or cannot correct the error at step 404, the LCC will then, at step 406, attempt an entity-level restoration (ELR) by first determining the specific entity that is damaged and then restoring that entity from another source (such as a backup or a sync replica). If both a PLR and an ELR are not possible or cannot correct the error at 408, then at step 410 the LCC will replace the damaged entity in the store with a dummy entity (DE) in order to guarantee a consistent view of the file system store as discussed below.

By replacing a damaged entity with a DE, the LCC ensures that removal of said damaged entity does not corrupt children entities of said damaged entity—that is, the LCC prevents cascading corruptions down-level from the corrupted entity to its children. To accomplish this, the DE essentially replaces the damaged entity but retains as much information from the damaged entity as possible. If the damaged entity is an item, for example, the replacing DE will retain as much of the property data as it can, as well as all of the relationships to other items. On the other hand, if the damaged entity is a relationship, the replacing DE will continue to connect the items to which it pertains together. The damaged entity, meanwhile, is moved to (for items) or logged in (for relationships) a broken item folder (BIF). When the damaged entity is an item, the BIF will have a relationship (e.g., a holding relationship) with the damaged entity.

Figure 5B:
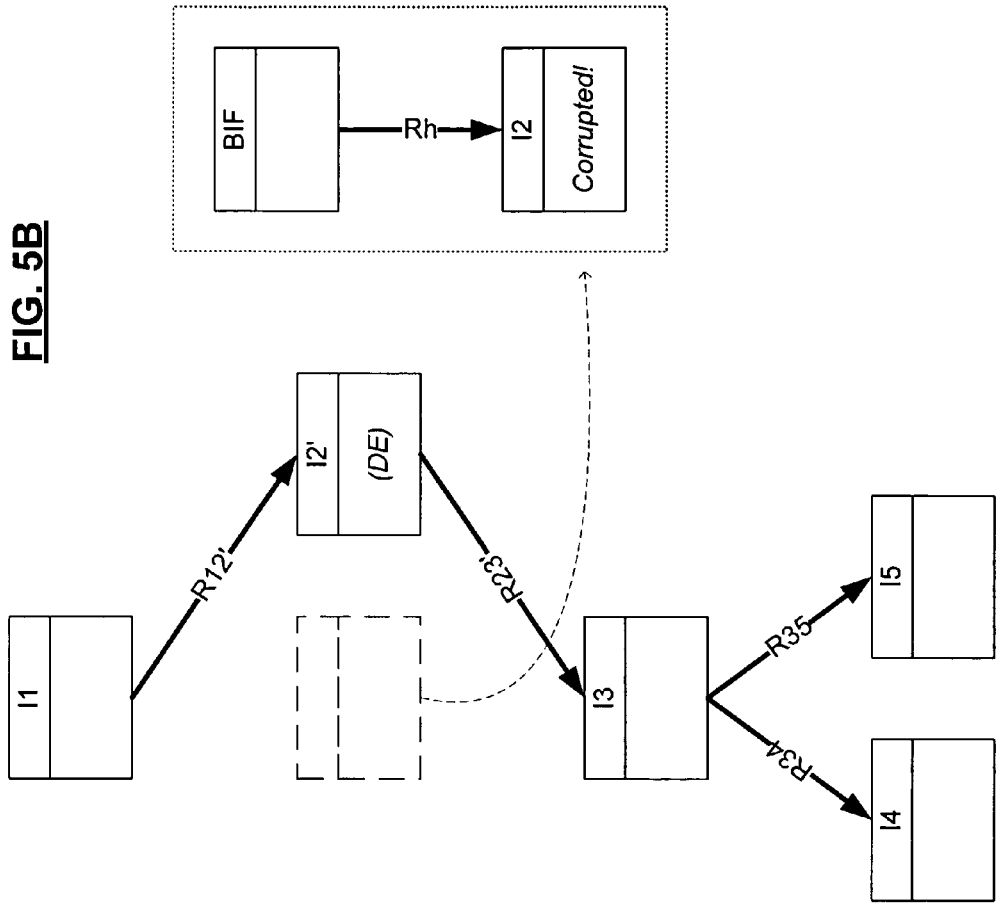
FIGS. 5A and 5B are block diagrams that illustrate the replacement methodology regarding item entities for certain embodiments of the present invention.
Figure 5A:
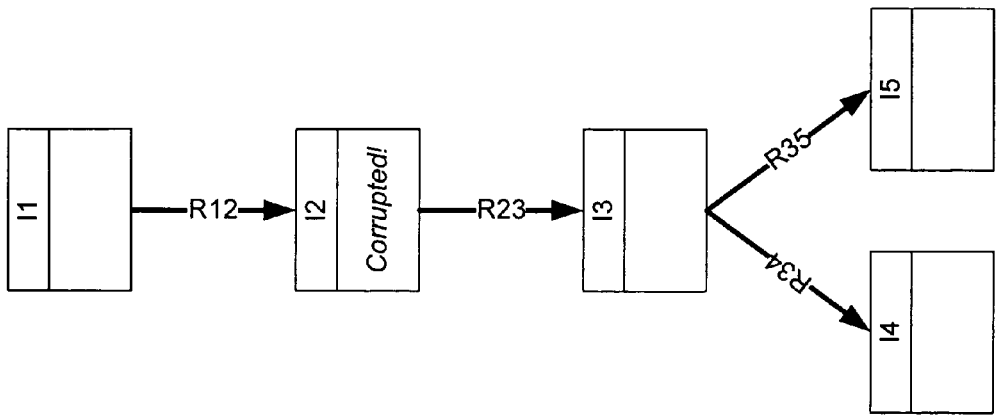

FIGS. 5A and 5B are block diagrams that illustrate the replacement methodology regarding items for certain embodiments of the present invention. In FIG. 5A, which illustrates a set of items and relationships, I1 is a parent item, I2 is a child item of I1 via relationship R12, I3 is a child item of I2 via relationship I23, and I4 and I5 are children items of I3 via relationships R34 and R35 respectively. In this example, item I2 is corrupted by, for example, a buggy application and, as a result, item I2 is now in violation of the data model rules. In FIG. 5B, the LCC, having identified I2 as a corrupted item, first creates DE I2' and establishes a first relationship R12' between the DE I2' and its parent I1 and a second relationship R23' between the DE I2' and its child I3. For certain embodiments, the DE is given the same item identification number (ItemID) as the corrupted item. Corrupted item I2 is then moved to the BIF and with a holding relationship Rh between the BIF item and the damaged item I2.

For certain embodiments, the new relationships R12' and R23' may in fact be the original relationships R12 and R23 that are updated to associated with I2' instead of I2. For other embodiments, R12' and R23' may be entirely new relationships and, for certain such embodiments, R12 and R23 may be retained as dangling relationships with damaged item I2 in the BIF. Regardless, the DE effectively preserves the parent/child structure for the dataset and thereby prevents an error to I2 to cascade as errors in I3, I4, and I5 that might otherwise be unreachable from I1.

Figure 6B:
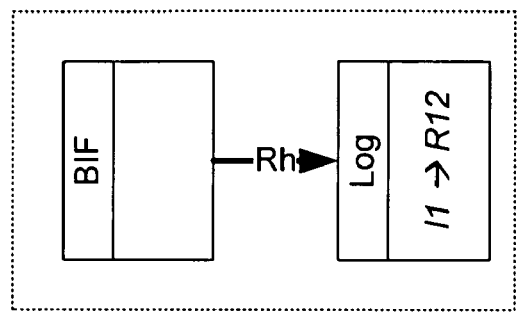
FIGS. 6A and 6B are block diagrams that illustrate the replacement methodology regarding relationship entities for certain embodiments of the present invention.
Figure 6A:
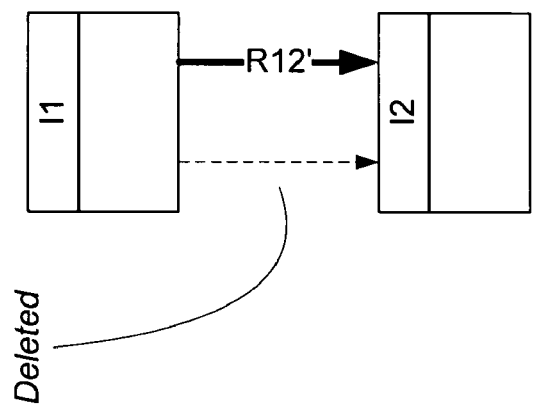
Figure 6A:
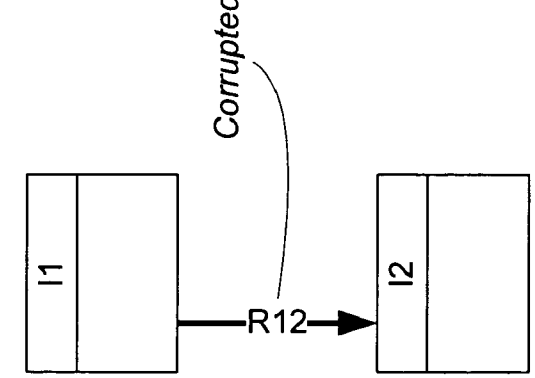

FIGS. 6A and 6B are block diagrams that illustrate the replacement methodology regarding relationships for certain embodiments of the present invention. In FIG. 6A, which illustrates a partial set of items and relationships, I1 is a parent item, and I2 is a child item of I1 via relationship R12. In this example, relationship R12 is corrupted by, for example, a virus that, as a result, causes relationship R12 to have a property value, e.g., a security property value, outside of some predetermined permitted range in the data model. In FIG. 6B, the LCC, having identified R12 as a corrupted relationship, first creates DE R12' between the I2 and its parent I1, and corrupted relationship R12 is eliminated (and not moved to the BIF since a relationship cannot exist alone in the BIF) and item I1, which owned the relationship R12, is logged into the BIF (the BIF having a special log for this purpose and shown herein, for example, as a log item).

In regard to synchronization, and to avoid the possibility of a corrupted entity being erroneously synchronized from partner to partner (thereby spreading the corruption), certain embodiments of the present invention compartmentalize identified and/or corrupted corruptions by marking DEs with a special "non authoritative" flag (e.g., a singe bit) that effectively notifies any sync replica that has a good copy of this entity to overwrite this entity (at which point the non-authoritative bit is cleared). Similarly, if a DE is subsequently modified (such as by an end-user), certain embodiments will also mark the DE as "non-authoritative and modified" to ensure that a conflict resolution procedure is employed as between the modified DE and the good copy of the original item on a replica, and the non-authoritative and modified marking will be removed as soon at the conflict has been resolved.

Additional Functionality

As described herein, item extensions are considered part of the owning item, and thus any extension corruption is deemed item corruption. However, in certain alternative embodiments, extensions may be treated as distinct and separate from their owning items.

For certain embodiments of the present invention, a LCC is run on entities following a restoration operation performed to correct physical corruption.

For certain embodiments, a LCC will attempt to repair corrupted items first before attempting to correct corrupted relationships in order to avoid the detection of "phantom" corruptions that might result if an item is not corrected before the relationships that depend on it is corrected.

For certain embodiments, the BIF is a folder item created may be created by the LCC if one does not already exist in the DBFS. This folder may hold any type of item in the DBFS (but not relationships for certain embodiments) and the folder may be located off of the root of the default database store (for easy access and locating).

For certain embodiments, any items without backing files will be put into the BIF, as well as any files without corresponding items will also be placed in the BIF.

For certain embodiments, when a damaged item is moved to the BIF, the BIF may also store information pertaining to why the damaged item was moved to the BIF.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A system for analyzing and correcting damage to a database file system (DBFS), the system comprising:
    a computer system configured to effect an operating system that includes a database file system,
    wherein the database file system includes a logical consistency checker,
    the logical consistency checker configured to check referential integrity of a set of tables in a database corresponding to said DBFS for at least one logical inconsistency, and
    check structural integrity of a set of entities represented in said DBFS for at least one logical inconsistency,
    further wherein the logical consistency checker is configured to
        detect at least one logical inconsistency of a damaged entity,
        create, by the logical consistency checker when a logical data corruption associated with a damaged entity is detected, a dummy entity that includes at least a portion of information contained in the damaged entity,
        replace the damaged entity with the dummy entity, and
        associate the damaged entity with a broken item folder.

2. The system of claim 1 further comprising at least one subsystem for checking for at least one cycle that would constitute a logical inconsistency.

3. The system of claim 1 wherein the logical consistency checker is further configured to resolve at least one logical inconsistency by performing an operation selected from a group of operations consisting of a page-level restoration operation, and a entity-level restoration operation.

4. The system of claim 3 wherein the logical consistency checker is configured to first attempt a page-level restoration and, if the page-level restoration is not successful, then attempt an entity-level restoration and, if the entity-level restoration is not successful, then replace at least one damaged entity corresponding to said at least one logical inconsistency with a dummy entity.

5. The system of claim 1 wherein, the logical consistency checker is configured to replace a damaged entity with a dummy item by creating said dummy item, redirecting at least one relationship belonging to said damaged entity to said dummy item, and moving said damaged entity to a broken item folder.

6. The system of claim 1, wherein the damaged entity is a relationship, and the portion of information contained in the relationship defines a relationship from a first item to another item in the database file system.

7. The system of claim 1, wherein the logical consistency checker is further configured to log the logical inconsistency in the broken item folder.

8. The system of claim 1, wherein dummy entity is assigned the same identification number as the damaged entity, wherein identification numbers are used by the database file system to identity entities in the database file system.

9. An automated data reliability system (DRS) for a database file system (DBFS), said DRS effected by a computer system and comprising:
a set of policies for performing database administration (DBA) tasks;
a subsystem for resolving a set of physical data corruptions at a page level; and
a subsystem for resolving a set of logical data corruptions at an entity level,
wherein the subsystem for resolving the set of logical data corruptions is configured to
detect at least one logical inconsistency associated with a damaged entity,
create, when a logical data corruption on an entity level associated with a damaged entity is detected, a dummy entity that includes at least a portion of information contained in the damaged entity,
replace the damaged entity with the dummy entity, and
associate the damaged entity with a broken item folder.

10. The automated data reliability system of claim 9 wherein said DBFS is a component of an operating system effected by a computer system.

11. The automated data reliability system of claim 9 further comprising an interface for adding, deleting, and modifying at least one functionality from among the following group of functionalities: error and event notifications, policies, and error and event handling algorithms.

12. The automated data reliability system of claim 9 wherein said DRS operates as a background thread.

13. The automated data reliability system of claim 9 wherein said subsystem for resolving a set of logical data corruptions at an entity level is executed after execution of said subsystem for resolving a set of physical data corruptions at a page level.

14. The automated data reliability system of claim 9 wherein said subsystem for resolving a set of logical data corruptions at an entity level attempts to repair a corrupted entry before attempting to correct a corrupted relationship corresponding to said corrupted entry.

15. A method for analyzing and correcting damage to a database file system (DBFS), said method comprising:
checking, by a logical consistency checker of a database file system effected by a computer system, referential integrity of a set of tables in a database corresponding to said DBFS for at least one logical inconsistency;
checking structural integrity of a set of relationships represented in said DBFS for at least one logical inconsistency;
detecting at least one logical inconsistency associated with the structural integrality of a damaged entity;
creating, when a logical data corruption associated with a damaged entity is detected, a dummy entity that includes at least a portion of information contained in the damaged entity;
replacing the damaged entity with the dummy entity; and
associating the damaged entity with a broken item folder.

16. The method of claim 15 further comprising checking for at least one cycle that would constitute a logical inconsistency.

17. The method of claim 15 further comprising:
performing, by the logical consistency checker, an operation selected from a group of operations consisting of a page-level restoration operation, and an entity-level restoration operation.

18. The method of claim 17 further comprising:
attempting a page-level restoration;
if said attempt at a page-level restoration is not successful, then attempting an entity-level restoration; and
if said attempt at an entity-level restoration is not successful, then replacing the damaged entity with the dummy entity.

19. The method of claim 15 wherein, if said entity is an item, said solution of replacing a damaged entity with a dummy entity further comprises:
creating said dummy entity and redirecting at least one relationship belonging to said damaged entity to said dummy entity; and
moving said damaged entity to a broken item folder.

20. The method of claim 15 wherein, if said entity is a damaged relationship, said solution of replacing a damaged entity with a dummy entity comprises:
creating said dummy entity as a relationship corresponding to the damaged relationship; and
logging said damaged relationship in a broken item folder.

21. A method for an automated data reliability system (DRS) for a database file system (DBFS) to address logical inconsistencies on an entity-level, said method comprising:
utilizing a set of policies for performing database administration (DBA) tasks;
checking, by the DRS effected by a computer system, if a database file system includes one or more logical inconsistencies at an entity-level, wherein a logical inconsistency includes at least one of a physical data corruption at a page level and a logical data corruption at an entity level;
correcting, by the DRS, at least one identified set of physical data corruptions at a page level;
creating, by the DRS when a logical data corruption on an entity level associated with a damaged entity is detected, a dummy entity that includes at least a portion of information contained in the damaged entity;
replacing the damaged entity with the dummy entity; and
associating the damaged entity with a broken item folder.

22. The method of claim 21 wherein said DBFS is a component of an operating system effected by a computer system.

23. The method of claim 21 further comprising an interface for adding, deleting, and modifying at least one functionality from among the following group of functionalities: error and event notifications, policies, and error and event handling algorithms.

24. The method of claim 21 wherein said DRS operates as a background thread.

25. The method of claim 21 wherein creating the dummy entity when a damaged entity is detected is executed after correcting the least one identified set of physical data corruptions at a page level.

26. The method of claim 21, further comprising:
detecting a damaged entity, wherein the damaged entity is an item; and
attempting to repair the damaged item prior to attempting to correct a damaged relationship corresponding to said damaged item.

27. A computer-readable storage medium comprising computer-readable instructions for analyzing and correcting damage to a database file system (DBFS), said computer-readable instructions comprising instructions for:

checking, by a logical consistency checker of a database file system, referential integrity of a set of tables in a database corresponding to said DBFS for at least one logical inconsistency;

checking structural integrity of a set of entities represented in said DBFS for at least one logical inconsistency;

creating, when a logical inconsistency associated with a damaged item is detected, a dummy item that includes at least a portion of information contained in the damaged item and relationships corresponding to the relationships of the damaged item;

replacing the damaged item with the dummy item; and moving the damaged item to a broken item folder.

28. The computer-readable instructions of claim 27 further comprising instructions for checking for at least one cycle that would constitute a logical inconsistency.

29. The computer-readable instructions of claim 27 further comprising:

instructions for performing, by the logical consistency checker, an operation selected from a group of operations consisting of a page-level restoration operation, and an entity-level restoration operation.

30. The computer-readable instructions of claim 27 further comprising instructions for:

attempting a page-level restoration;

if said attempt at a page-level restoration is not successful, then attempting an entity-level restoration; and if said attempt at an entity-level restoration is not successful, then replacing the damaged item with the dummy item.

31. The computer-readable instructions of claim 27, wherein the dummy item is assigned the same identifier as the broken item, wherein identifiers are used by the database file system to identify items in the database file system.

32. The computer-readable instructions of claim 27 further comprising instructions for:

creating, when a logical inconsistency associated with a damaged relationship is detected, a dummy relationship that corresponds to the damaged relationship; and logging said damaged relationship in a broken item folder.

33. A computer-readable storage medium comprising computer-readable instructions for an automated data reliability system (DRS) for a database file system (DBFS) to address logical inconsistencies on an entity-level, said computer-readable instructions comprising instructions for:

utilizing a set of policies for performing database administration (DBA) tasks;

resolving a set of physical data corruptions at a page level; and resolving a set of logical data corruptions at an entity level, wherein the instructions for resolving the set of logical data corruptions include instructions for detecting at least one logical inconsistency associated with a damaged entity, instructions for creating, when a logical inconsistency associated with a damaged item is detected, a dummy entity that includes at least a portion of information contained in the damaged entity, instructions for replacing the damaged entity with the dummy entity, and instructions for associating the damaged entity with a broken item folder.

34. The computer-readable instructions of claim 33 further comprising instructions whereby said DBFS is a component of an operating system effected by a computer system.

35. The computer-readable instructions of claim 33 further comprising instructions for an interface for adding, deleting, and modifying at least one functionality from among the following group of functionalities: error and event notifications, policies, and error and event handling algorithms.

36. The computer-readable instructions of claim 33 further comprising instructions whereby said DRS operates as a background thread.

37. The computer-readable instructions of claim 33 further comprising instructions whereby said element of resolving a set of logical data corruptions at an entity level is executed after the execution of said subsystem for resolving a set of physical data corruptions at a page level.

38. The computer-readable instructions of claim 33 further comprising instructions whereby said element of resolving a set of logical data corruptions at an entity level further comprises attempting to repair a corrupted item before attempting to correct a corrupted relationship corresponding to said corrupted item.

39. A hardware control device for an automated data reliability system (DRS) for a database file system (DBFS) to address logical inconsistencies on an entity-level, said device comprising means for:

utilizing a set of policies for performing database administration (DBA) tasks; checking, if a database file system includes one or more logical inconsistencies at an entity-level, wherein a logical inconsistency includes at least one of a physical data corruption at a page level and a logical data corruptions at an entity level;

correcting at least one identified set of physical data corruptions at a page level;

creating, by the DRS when a logical data corruption on an entity level associated with a damaged entity is detected, a dummy entity that includes at least a portion of information contained in the damaged entity;

replacing the damaged entity with the dummy entity; and associating the damaged entity with a broken item folder.

* * * * *